United States Patent [19]

Robinson et al.

[11] Patent Number: 5,200,448
[45] Date of Patent: Apr. 6, 1993

[54] FREEZE-THAW STABLE POLYACRYLAMIDE EMULSIONS

[75] Inventors: Peter M. Robinson, High Point, N.C.; Martin R. Jenkins, Columbus, Ga.

[73] Assignee: Exxon Chemical Patents Inc., Linden, N.J.

[21] Appl. No.: 860,310

[22] Filed: Mar. 27, 1992

Related U.S. Application Data

[60] Continuation of Ser. No. 327,388, Mar. 21, 1989, abandoned, which is a division of Ser. No. 122,494, Feb. 5, 1988, which is a continuation of Ser. No. 816,171, Jan. 3, 1986.

[51] Int. Cl.$^5$ ................................................ C08K 5/10
[52] U.S. Cl. .................................. 524/317; 524/458; 524/460; 524/517
[58] Field of Search ................ 524/317, 460, 517, 458

[56] References Cited

U.S. PATENT DOCUMENTS

4,339,371  7/1982  Robinson et al. .................... 524/517

FOREIGN PATENT DOCUMENTS

0810575  3/1959  United Kingdom ................ 524/517
0813947  5/1959  United Kingdom ................ 524/517

*Primary Examiner*—Joseph L. Schofer
*Assistant Examiner*—J. M. Reddick

[57] ABSTRACT

Water-in oil emulsions of water-soluble polymers, i.e. polyacrylamides, are stabilized against repeated freeze-thaw cycles by incorporating specific polymeric surfactants while maintaining the total amount of the primary surfactant at less than about 2 percent.

12 Claims, No Drawings

FREEZE-THAW STABLE POLYACRYLAMIDE EMULSIONS

This is a continuation of copending application Ser. No. 07/327,388 filed on Mar. 21, 1989 now abandoned which is a division of Ser. No. 122,494 filed Feb. 5, 1988 which is a continuation of Ser. No. 06/816,171 filed Jan. 3, 1986.

This invention relates generally to water-soluble polymers dispersed in water-in-oil emulsions. More particularly, the present invention relates to water-in-oil emulsions of water-soluble polymers which contain preferably less than about 2% by weight of one or more primary surfactants (emulsion polymerization stabilizers) together with an oil-soluble, water-insoluble polymeric surfactant. The freeze-thaw stability is provided to the emulsion by the presence of the polymeric surfactant.

Water-in-oil emulsions containing water-soluble polymers dispersed therein are well known in the art. Such emulsions have found a wide variety of uses, for example, as flocculants in the mining and paper industries and in sewage treatment, and as mobility control agents in enhanced oil recovery. Many of these applications occur in low temperature environments, i.e. below 0° C. and even as low as −10° C., where freezing of the emulsions before use is likely to occur. When such frozen emulsions are thawed for use, there is generally a problem of gel formation and/or a loss of product quality. To overcome this problem in the past the art has been forced to add glycols or inorganic salts to depress the freezing point of the emulsions, or to reduce the amount of water-soluble polymer in the system for a given surfactant level (diluting the polymer or increasing the surfactant), or dehydrating the emulsion, or alternatively using special expensive low-titre surfactants. In view of the fact that all of these proposed solutions has resulted in either reducing the product performance or greatly increasing the cost of the resultant emulsions, there is a continuing need for a method of improving the freeze-thaw stability of such emulsions while at the same time minimizing the total amount of surfactant present in the system. It is well known that using large amounts of surfactants can penalize product performance by the interaction of the surfactants with the water-soluble polymer when the emulsion is inverted for use.

The present invention entails adding small but effective amounts of a maleic anhydride-based polymeric surfactant to a conventional water-in-oil emulsion of a water-soluble polymer while reducing the total amount of primary surfactant present.

Maleic anhydride-based polymeric surfactants have been utilized as pour point depressants in combination with hydrocarbon or synthetic oils such as in U.S. Pat. No. 2,542,542.

U.S. Pat. No. 3,073,805 discloses that cross-linked polymers of olefins, such as ethylene and propylene, with maleic anhydride may be used as viscosity control agents when dispersed in water, thickening agents, stabilizers for detergents, and as clay beneficiating agents useful in the preparation of drilling muds and other compositions. Similarly, U.S. Pat. No. 3,083,189 discloses that cross-linked olefin-maleic anhydride interpolymers are hydrolytically stable and as such are useful as viscosity control agents.

U.S. Pat. No. 3,370,047 is directed to copolymers produced from maleic anhydride and bicyclo(2,2,1)-hept-2-ene and the use thereof as pour point depressants in lubricating compositions.

U.S. Pat. No. 3,441,151 discloses the use of the reaction product of an amine with a styrene-maleic anhydride polymer as the primary emulsifying agent for polymeric oil-in-water emulsions which are alleged to exhibit prolonged storage stability, freeze-thaw stability, mechanical stability, reproducible emulsion viscosity from batch to batch, and outstanding resistance to water and alkaline soaps and detergents when used in floor polish and coating formulations.

Copolymers of maleic anhydride and 1-octadecene have also been claimed to be useful as stabilizers for cosmetic preparations. It should be noted, however, that none of the examples set forth in U.S. Pat. No. 3,936,427, show the actual incorporation of a copolymer of maleic anhydride and 1-octadecene into a cosmetic preparation.

The use of an oil-soluble, water-insoluble polymeric surfactant with a polyacrylamide emulsion per se is taught in U.S. Pat. No. 4,339,371. This patent teaches the use of a maleic-anhydride based polymer during polymerization to allow the formation of polyacrylamide based water-in-oil emulsions with high concentrations (40 to 60% by weight) of water-soluble polymers. The patent neither recognizes nor suggests the use of Gulf PA-18 as a freeze-thaw agent to stabilize a water-in-oil emulsion.

U.S. Pat. No. 4,506,051 is directed to water-in-oil emulsions having improved low temperature properties. It incorporates an N,N,-dialkylamide in the emulsion so that the stability of the emulsion upon repeated freeze-thaw cycles or the fluidity of the emulsion at low temperatures such as −20° C. is improved. The water-soluble polymers utilized are copolymers of acrylamide and acrylic acid. It does not teach the use of the maleic anhydride-based surfactants as freeze-thaw stabilizing agent.

U.S. Pat. No. 4,022,731 and U.S. Pat. No. 4,022,736 are also directed to freeze-thaw stable, self-inverting, water-in-oil emulsions, wherein the water-soluble polymeric material is a polyacrylamide-based polymer. Neither of these patents suggest the use of the maleic anhydride-octadecene-1 polymer surfactant as a freeze-thaw agent.

The above discussion of the prior art indicates that maleic anhydride copolymers are well known and have been used in numerous and varied processes as viscosity modifiers, pour point depressants, emulsifiers and the like. However, none of the prior art suggests that the addition of a small amount of specific copolymers would produce water-in-oil emulsions which have freeze-thaw stability and excellent mechanical stability while still containing a reduced amount of primary surfactant.

It is accordingly an object of the present invention to produce water-in-oil emulsions of finely dispersed water-soluble polymeric particles in which the emulsions have improved freeze-thaw stability at a low level of primary surfactants.

It is a further object to reduce the total amount of all primary surfactants to below 1.8% by weight of the total emulsion.

It is a further object to prepare emulsions with mechanical properties equivalent to or better than conventional non-freeze-thaw stabilized emulsions while reducing the total amount of stabilizers and/or other additives.

These and other objects will become apparent from the ensuing description.

It has been discovered that the addition of certain oil-soluble, water-insoluble polymeric surfactants will provide freeze-thaw stability to water-in-oil emulsions which are not freeze-thaw stable and which contain less than about 38 percent by weight water-soluble polymeric solids. In addition, the present invention permits the use of minimum levels of the primary surfactants, merely enough to stabilize the emulsion during polymerization, i.e. less than about 2 percent by weight of the total emulsion. The resultant emulsions also possess excellent mechanical stability.

The oil-soluble, water insoluble polymeric surfactant useful in the present invention has the general formula:

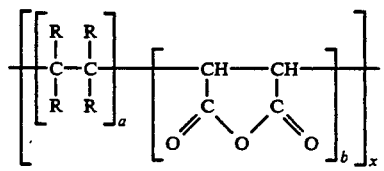

wherein x is a whole number greater than about 5, the mole ratio of a to b is from about 3:1 to about 1:3, provided the HLB number is maintained at less than about 14, preferably less than about 10, and each of the R groups are each independently hydrogen, alkyl ($C_{1-48}$), alkoxy ($C_{1-48}$), alkenyl ($C_{2-48}$), aryl ($C_{6-12}$) and alkaryl ($C_{7-12}$), provided that at least one R is alkyl with at least about 12 carbon atoms, preferably at least 14 carbon atoms, and most preferably at least 16 carbon atoms.

Preferred surfactants correspond to the above formula wherein x is about 100 to 400, the ratio of a:b is about 1:1, three of the R groups are hydrogen and one is $C_{16}H_{33}$.

The polymeric surfactant may be prepared in any suitable manner, generally by reacting maleic anhydride with an appropriate comonomer. Such preparation may, for example, be conducted in the manner disclosed in U.S. Pat. No. 3,732,337, which is incorporated herein by reference. It is to be noted, however, that the particular method of preparing the polymeric surfactant does not constitute a feature of this invention. Such a material is available as, for example, PA-18 from Gulf.

The polymeric surfactant is added to the emulsion either before or after polymerization and in an amount effective to provide freeze-thaw stability to the final emulsion. When added after polymerization, the polymeric surfactant may be blended with an inverting breaker surfactant prior to its addition to the emulsion. Generally, the amount will be greater than about 0.2 percent by weight based on the total weight of the emulsion and less than about 1 percent. More preferably the amount is at least about 0.25 percent. Generally, there is no advantage to adding more than the minimum amount of the surfactant as determined by routine experimentation.

Also within the scope of the above definition of the polymeric surfactant are suitable oil-soluble, water-insoluble derivatives thereof. As is obvious to those skilled in the art, such derivatives may be prepared by reaction of the polymeric surfactant with, for example, an alcohol or an amine. British Pat. No. 1,093,081 discloses the use of a surfactant similar to a cationic derivative of the surfactant of this invention as a dispersing agent for fine particles in non-aqueous solvents.

Although the present invention has been found to be independent of the particular emulsion polymerization method employed, certain preferences are delineated in the general description of emulsion preparation which follows.

A preliminary emulsion is made by homogenizing oil and aqueous phases. The oil phase of the emulsion, which generally comprises from about 5 to 35 percent by weight of the total emulsion, is comprised of one or more inert hydrophobic liquids. Preferably, the oil phase comprises about 20 to 30 percent of the emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, naphthas, chlorinated hydrocarbons, such as perchloroethylene, and the like.

The oil phase also contains the primary surfactants, i.e. conventional emulsion polymerization stabilizers. Such stabilizers are well known to the art to promote the formation and stabilization of water-in-oil emulsions. Normally such emulsifiers have HLB values in the range of about 2 to about 10, preferably less than about 7. Suitable such emulsifiers include the sorbitan esters, phthalic esters, fatty acid glycerides, glycerine esters, as well as the ethoxylated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus any emulsifier may be utilized which will permit the formation of the initial emulsion and stabilize the emulsion during the polymerization reaction, but will not provide sufficient freeze-thaw stability to the final emulsion such that the emulsion will pass at least three cycles of freeze-thaw stability test as described in Example I below.

These primary surfactants are used alone or in mixtures and are utilized in as low amounts as is possible since an excess will not only increase the cost of the resultant emulsion but may also reduce the performance. As such, all of the primary surfactants should together be used in amounts not greater than 3% by weight of the total emulsion. Preferably the amount is not greater than 2%, and most preferably it is less than about 1.8%.

The aqueous phase generally comprises about 95 to 65 percent by weight of the emulsion. Preferably, it comprises about 80 to 70 percent thereof. In addition to water, the aqueous phase contains the monomers being polymerized, generally in an amount of less than about 38 percent, preferably about 20 to about 35 percent and most preferably about 22 to about 30 percent, by weight of the total emulsion, and generally chain transfer agents, initiators and sequesterants. Alternatively, the chain transfer agents, initiators and sequesterants may be added to the system after the preliminary emulsion has been prepared. The initiator may also be added continuously during the polymerization to control the rate of polymerization depending upon the particular monomers used and their reactivities. Further alternatively, the initiator may be present in either the oil or the aqueous phase with the monomers being added either continuously or incrementally thereafter. All of these variations are well known in the art.

Any monomers which, when polymerized or copolymerized, yield water-soluble polymers may be used in the present invention. The term "water-soluble" means that the polymer is soluble in water in an amount of at least 1% by weight. The polymer may be nonionic, anionic with less than about 35, preferably less than 25, mole percent anionicity, or cationic with less than about 15, preferably less than 10, mole percent cationicity. When the anionicity or cationicity are above these amounts, the resultant emulsions are generally inherently freeze-thaw stable and there is no need to add the polymeric surfactant to obtain the stability. Examples of monomers useful herein include acrylamide, acrylic acid and its salts, methacrylamide, methacrylic acid and its salts, maleic acid and its salts, methyl acrylate, ethyl acrylate, propyl acrylate, methyl methacrylate, ethyl methacrylate, dimethylaminoethyl acrylate and its methylchloride and methosulfate quaternaries, dimethylaminoethyl methacrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic acid and its salts, 3-(methylacrylamido)-propyltrimethylammonium chloride, dimethylaminopropylmethacrylamide, isopropylaminopropylmethacrylamide, methacrylamidopropylhydroxyethyldimethylammonium acetate, vinyl methyl ether, vinyl ethyl ether, alkali metal and ammonium salts of vinyl sulfonic acid, vinyl pyridine, vinyl pyrrolidone, vinyl imidazole, diallyldimethylammonium chloride, styrene sulfonic acid and its salts, and the like. Preferably, the monomers are selected from acrylamide, acrylic acid and its salts, a quaternary of dimethylaminoethyl methacrylate, and 3-(methylacrylamido)propyltrimethylammonium chloride. Most preferably the polymer is polyacrylamide, a copolymer of acrylamide and acrylic acid or its salts, or a copolymer of acrylamide and a quaternary of dimethylaminoethyl methacrylate.

Any conventional chain transfer agent may be employed, such as propylene glycol, isopropanol, 2-mercaptoethanol, sodium hypophosphite, dodecyl mercaptan and thioglycolic acid. The chain transfer agent is generally present in an amount of about 0.1 to 10 percent by weight of the total emulsion, though more may be used.

The initiator may be any free radical producing material well known in the art. The preferred free radical initiators are the redox-type and the azo-type polymerization initiators and they are generally used in an amount of about 0.0005 to 0.5 percent by weight of the total emulsion. Radiation may also be used to initiate the reaction.

Any conventional sequesterant may also be present in the aqueous phase, such as ethylenediaminetetraacetic acid or pentasodium diethylenetriamine pentaacetate. The sequesterant is generally present in an amount of about 0.01 to 2 percent by weight of the total emulsion, though more may be utilized.

Following preparation of the preliminary emulsion, polymerization of the monomers is commenced at a temperature sufficiently high to break down the initiator to produce the desired free radicals. Generally a suitable temperature is about −20° C. to 200° C. with a preferred temperature of about 20° C. to 100° C.

Preferably the polymerization is run at a pH of about 2 to 12 and a suitable amount of base or acid may be added to the preliminary emulsion to achieve the desired pH. The polymerization is usually completed in about an hour or two to several days, depending upon the monomers employed and other reaction variables. It is generally carried out at atmospheric pressure, but higher pressures are advantageously used when volatile ingredients are involved.

Following completion of the polymerization, the pH of the emulsion may be adjusted as desired. For an anionic polymer emulsion, this is generally about 4 to 10; for cationic emulsions about 2.0 to 5.5; and for nonionic emulsions about 2.0 to 7.0. A breaker surfactant is generally added to yield a single package of final product. Any suitable breaker surfactant may be employed, experimentation being the best means of determining which breaker surfactant will perform optimally with a given emulsion system. Typical breaker surfactants include those having relatively high HLB numbers such as ethoxylated octyl and nonyl phenols, ethoxylated nonyl phenol formaldehyde resin, polyethylene oxide esters of fatty acids, dioctyl esters of sodium sulfosuccinate and others disclosed in U.S. Pat. No. 3,624,019 incorporated herein by reference. Typically, the breaker surfactant is added in an amount equal to about 0.5 to 5 percent by weight, based on the total emulsion. Preferably the amount is less than 3 percent and most preferably less than about 2.5 percent. It is an additional benefit of the present invention that the amount of the breaker surfactant required may be reduced below that amount which would otherwise be required.

Once prepared, the emulsions of the present invention may be chemically modified in any known manner. "Chemically modified" is intended to cover further treatment of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed in U.S. Pat. Nos. 4,052,353 and 4,171,296, incorporated herein by reference. The emulsion of the present invention may also be concentrated in any suitable manner, such as is disclosed in U.S. Pat. No. 4,021,399, incorporated herein by reference.

The following examples are illustrative of the present invention, but are not in any way a limitation thereof. All parts are by weight unless otherwise specified.

EXAMPLE I

A water phase containing 260 g. of acrylamide, 1.2 g. of ethylenediaminetetraacetic acid, 0.5 g. of potassium bromate, and 431.6 g. of water is homogenized with an oil phase containing 240 g. of oil, 12.5 g. of ricinoleic acid triglyceride ester which has been hydrogenated and ethoxylated with five moles of ethylene oxide, and 4.1 g. of sorbitan monooleate. The resulting emulsion system is then transferred to a suitable reaction vessel with stirring and sparged with nitrogen. 23.5 g. of a 4.5% solution of sodium bisulfite is added continuously during the polymerization and the temperature of the emulsion increases to about 35°-45° C. Cooling is provided to maintain this temperature and agitation is maintained for 4-10 hours. The polymerization is completed at the end of that time and results in a non-ionic polyacrylamide emulsion having 26 percent polymer solids.

The emulsion is split into two portions of 486.7 g. each. To one portion (A) is added 12.0 g. of a mixture of polyethylene glycol sesquioleate, polyethylene glycol dioleate and ethoxylated nonyl phenol (the "breaker system") to yield a one package product. To the other portion (B) is added the same 12.0 g. of the breaker system along with 1.3 g. of a polymeric surfactant of the formula:

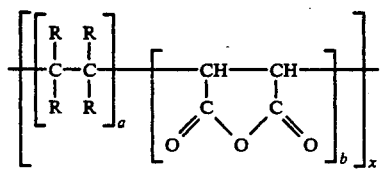

wherein x is about 140, the ratio of a:b is 1:1, three of the R groups are hydrogen and the fourth R group is $C_{16}H_{33}$.

The two finished emulsions are then evaluated for mechanical stability and freeze-thaw stability as follows:

1 - Mechanical Stability

Mechanical stability of each water-in-oil emulsion is determined by placing 50 grams of a final emulsion on a magnetic stirrer in a glass jar containing the emulsion and a heavy magnetic stirring bar. The unit is allowed to stir at a fixed speed of 1,000 to 1,500 rpm until gel particles form or the contents of the jar solidifies. The test is conducted from a minimum time period of 100 hours, typically for 1000 hours. Products passing the 100 hours are usually field acceptable; products passing the 1000 hours are acceptable under all field conditions.

2 - Freeze-Thaw Stability

The laboratory test for freeze-thaw stability is as follows: approximately 200 grams of the final emulsion product is frozen down with stirring in a cryogenic unit to −20° C. The product is then allowed to thaw to room temperature and its properties, e.g., viscosity, gel count are measured. The cycle is repeated until the product gels or for a maximum of 3 to 5 cycles.

Emulsion A, which represents the prior art, passed the mechanical stability test with 1,000 hours but failed the freeze-thaw test by being completely gelled after the first cycle.

Emulsion B, which represents the present invention, passed the mechanical stability test with 1,000 hours and in addition showed no change in viscosity and no gel formation after five freeze-thaw cycles.

EXAMPLE II

The basic procedure of Example I is repeated except that the polymeric surfactant is incorporated into the oil phase before homogenization and not added along with the breaker system after polymerization. The resultant emulsion passes both the mechanical stability and freeze-thaw tests as had Emulsion B of Example I.

EXAMPLE III

The basic procedure of Example I is repeated except that 20% of the ricinoleic acid is replaced by an equal amount of ricinoleic acid triglyceride ester which has been ethoxylated with five moles of ethylene oxide and 10 mole percent of the acrylamide is replaced by sodium acrylate. The emulsion which contains the polymeric surfactant passes the freeze-thaw test, while the one not containing it gels after the first cycle.

EXAMPLE IV

The basic procedure of Example III is repeated except that 3 mole percent of the acrylamide is replaced by the cationic monomer: dimethylaminoethylmethacrylate methyl chloride quaternary. The emulsion which contains the polymeric surfactant passes the freeze-thaw test, while the one not containing it gels after the first cycle.

EXAMPLE V

The basic procedure of Example Iv is repeated except that the amount of the cationic monomer is increased to 5 mole percent. The emulsion which contains the polymeric surfactant passes the freeze-thaw test while the one not containing it gels after the second cycle.

EXAMPLE VI

The basic procedure of Example I is repeated except that the ricinoleic acid is omitted and sorbitan monooleate is used as the only primary surfactant in varying amounts. The amounts as percents of the total formulation and the results are as follows:

| Amount | Result |
| --- | --- |
| 1.7% | Gelled during polymerization |
| 2.0% | Heavy gel contamination during polymerization |
| 3.0% | Both emulsions pass freeze-thaw test |

EXAMPLE VII

The basic procedure of Example I is repeated except that the sorbitan monooleate is omitted and mono- and diglycerides of fat forming fatty acids (HLB=2.8) is used as the primary surfactant in an amount of 1.95 percent by weight, based on the weight of the total emulsion. The emulsion which contains the polymeric surfactant passes the freeze-thaw test, while the other one does not.

EXAMPLE VIII

The procedure of Example I is repeated except that the PA-18 polymeric surfactant is replaced by other surfactants wherein the R groups, x and the ratio of a:b were as follows:

| Sample R Groups | x | a:b |
| --- | --- | --- |
| a) $CH_3$, H, H, $C_{14}H_{29}$ | 100 | 2:1 |
| b) H, $C_2H_5$, H, $C_{16}H_{33}$ | 12 | 1:2 |
| c) $C_2H_5$, $OCH_3$, $CH_3$, $C_{12}H_{25}$ | 400 | 1:1 |
| d) H, H, $C_6H_5$, $C_{22}H_{45}$ | 700 | 1:3 |

In each case, substantially similar freeze-thaw stabilized emulsions result.

COMPARATIVE EXAMPLE

The basic procedure of Example I was repeated except that the polymeric surfactant was replaced by maleic anhydride-based copolymers which do not meet the definition of those useful herein. The copolymers tested were:

a) EMA-1103 of Monsanto Chemical Company wherein the comonomer is ethylene, i.e. all four R groups in the formula above are H, and the molecular weight is about 8,000;

b) EMA-31 of Monsanto wherein the comonomer is again ethylene but the molecular weight is about 100,000;

c) SMA-1000 of Arco Chemicals wherein the comonomer is styrene, i.e. three R groups are H and one is phenyl, the ratio of styrene to maleic anhydride is 1:1, and the molecular weight is about 1200-1600;

d) SMA-2000 of Arco wherein the comonomer is again styrene but the ratio of styrene to maleic anhydride is 2:1;

e) SMA-3000 of Arco wherein the comonomer is again styrene but the ratio of styrene to maleic anhydride is 3:1; and f) Epolene-43 of Eastman Kodak Company wherein the comonomer is propylene, i.e. three R groups are H and one is methyl.

In addition, the polymeric surfactant is replaced by Rapisol B-246 of Imperial Chemical Industries Ltd. It is a linear ABA block copolymer of polyester-polyethylene oxide-polyester prepared by reacting condensed 12-hydroxystearic acid with polyethylene oxide as disclosed in U.S. Pat. No. 4,203,877.

In each of these seven cases, the additive had no effect on the freeze-thaw stability of the resultant emulsion, i.e. all failed to survive even one cycle.

Numerous modifications and variations of the present invention are possible in light of the foregoing disclosure and, therefore within the scope of the appended claims, the invention may be practiced otherwise than is particularly described.

What is claimed is:

1. A method of freeze-thaw stabilizing a water-in-oil emulsion of a water soluble polymer having 20 to 35 percent by weight polymeric solids comprising adding thereto a freeze-thaw stabilizing amount of a polymeric surfactant of the formula:

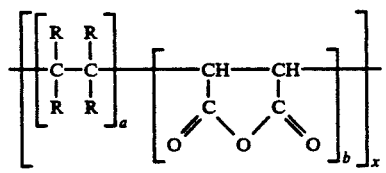

wherein x is a whole number greater than about 5, the mole ration of a:b is from about 3:1 to about 1:3, the HLB number is less than about 14, the R groups are independently selected from the group consisting of hydrogen, alkyl ($C_{1-48}$), alkoxy ($C_{1-48}$), alkenyl ($C_{2-48}$), aryl ($C_{6-12}$), and alkaryl ($C_{7-12}$) provided that at least one R group is alkyl ($C_{12-48}$), said amount being sufficient to make the emulsion more stable when subjected to freeze-thaw cycles than if no polymeric surfactant was employed.

2. The method of claim 1 wherein the water-soluble polymer is a polymer comprised of monomers selected from acrylamide, acrylic acid and its salts, methacrylamide, methacrylic acid and its salts, maleic acid and its salts, methyl acrylate, ethyl acrylate, propyl acrylate, methyl methacrylate, ethyl methacrylate, dimethylaminoethyl acrylate and its methylchloride and methosulfate quaternaries, dimethylaminoethyl methacrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic acid and its salts, 3-(methylacrylamido)propyltrimethylammonium chloride, dimethylaminopropylmethacrylamide, isopropylaminopropylmethacrylamide, methacrylamidopropylhydroxyethyldimethylammonium acetate, vinyl methyl ether, vinyl pyridine, vinyl pyrrolidone, vinyl imidazole, diallyldimethylammonium chloride, styrene sulfonic acid and its salts, or mixtures thereof.

3. The method of claim 1 wherein the polymeric surfactant is employed in an amount greater than about 0.25 percent by weight, based on the total emulsion.

4. The method of claim 1 wherein the polymeric surfactant is added to the emulsion prior to commencement of polymerization.

5. The method of claim 1 wherein the polymeric surfactant is added to the emulsion after completion of the polymerization.

6. The method of claim 5 wherein the polymeric surfactant is blended with an inverting breaker surfactant prior to its addition to the emulsion.

7. The method of claim 1 wherein the emulsion contains one or more primary surfactants in an amount less than about 2.0 percent by weight, based on the weight of the total emulsion.

8. The method of claim 1 wherein the primary surfactant is a mixture of a glyceride and a sorbitan ester.

9. The method of claim 1 wherein the water-soluble polymer is present in an amount of about 22 to 30 percent by weight, based on the total emulsion.

10. The method of claim 1 wherein x is about 100 to 400, the mole ratio of a:b is 1:1, three of the R groups are H and one is $C_{16}H_{33}$.

11. The method of claim 1 wherein the water-soluble polymer is selected from the group consisting of polyacrylamide, a copolymer of acrylamide and less than about 25 mole percent acrylic acid or its salts, and a copolymer of acrylamide and less than about 10 mole percent of a quaternary of dimethylaminoethyl methacrylate.

12. The method of claim 1 wherein the emulsion contains 22 to 30 percent by weight poymeric solids.

* * * * *